July 7, 1964 J. E. OSTLINE 3,140,350
PRIVATE AUTOMATIC BRANCH EXCHANGE DETECTOR
Filed Dec. 4, 1959
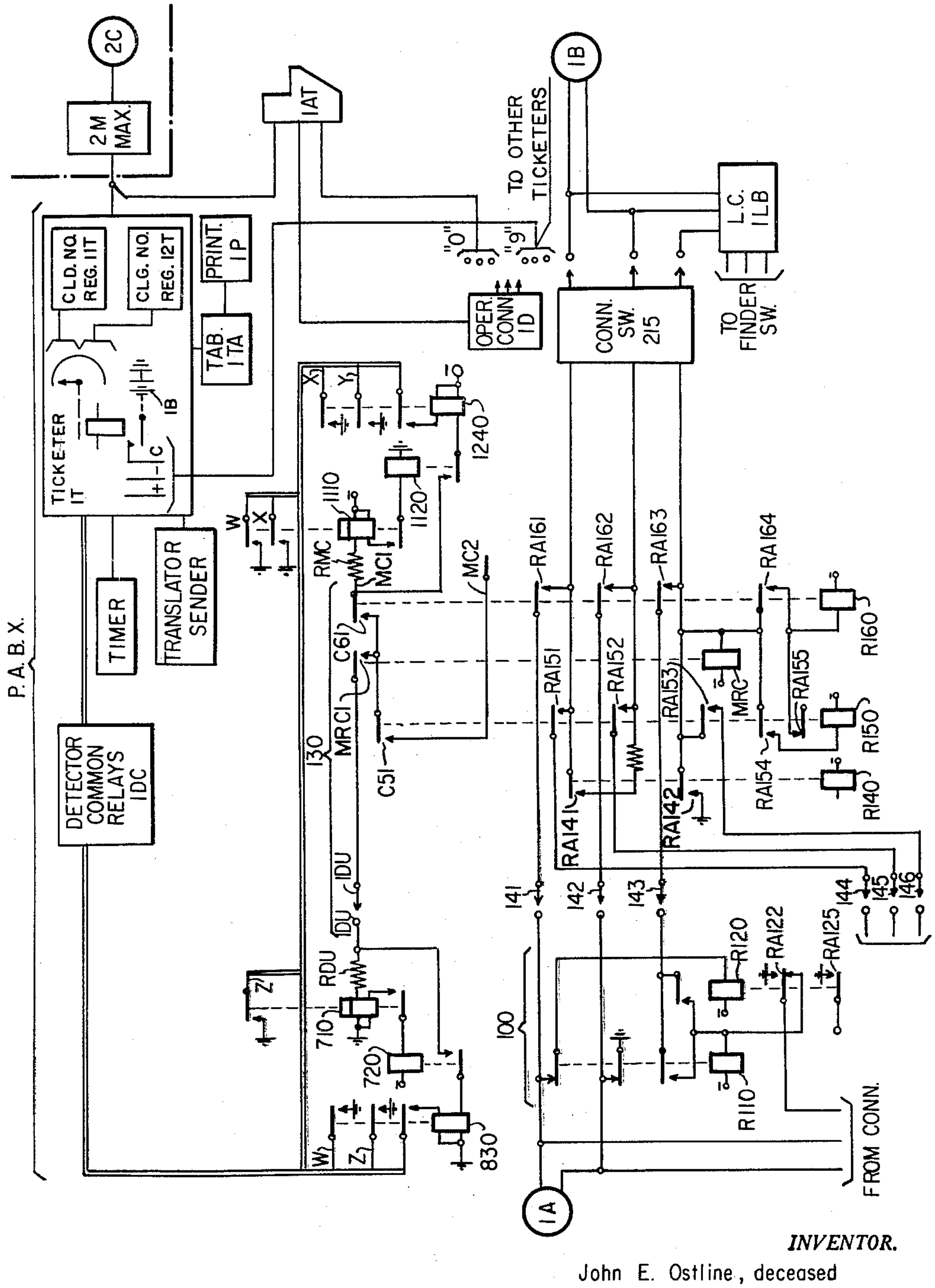
INVENTOR.
John E. Ostline, deceased
by Mattie A. Ostline, executrix
by C. U. [signature] Atty.

3,140,350
PRIVATE AUTOMATIC BRANCH EXCHANGE DETECTOR

John E. Ostline, deceased, late of Elmwood Park, Ill., by Mattie A. Ostline, executrix, Elmwood Park, Ill., assignor to Automatic Electric Laboratories, Inc., a corporation of Delaware Filed Dec. 4, 1959, Ser. No. 857,309
5 Claims. (Cl. 179—7.1)

The present invention relates to telephone systems, and more particularly to small automatic telephone systems of the type adapted for installations in industrial plants, institutions or hotels. An automatic telephone system of the character noted is generally known as a private automatic exchange. In order to facilitate the business of such organizations, provisions in the telephone exchanges for use therein are also included for trunking calls to and from the community main exchange. With these trunk connections such exchanges are known as private automatic branch exchanges indicated by the letters PABX.

Such arrangements have provided satisfactory service until the advent of customer toll dialling. Now institutions using such PABX's are experiencing excessive toll charges due to its users placing unauthorized toll calls. Various attempts have been made to restrict the users from placing toll calls, except for business purposes. These have met with success in most instances except for use in hotels where it is not desirable to restrict the patrons, while it is necessary to bill them for toll calls placed from their telephones.

Accordingly, it is an object of the present invention to provide in a PABX a means for recording the calling station and the called station identity.

It is another object of the invention to provide an improved means for identifying the calling station.

Another object of the invention is to provide in a telephone system of the type noted, facilities whereby data pertinent to the determination of charges for a call may be had immediately upon termination of the call.

Another object of the invention is to provide in a telephone system of the type noted an improved finder which after finding the calling line provides an indication of the particular line to the recorder.

A further object of the invention is to provide in a telephone system of the character noted an improved linefinder which includes line identifying equipment.

A further object of the invention is to provide in a telephone system arranged to identify the designation of a calling subsciber line a new and novel arrangement for automatically determining the identity of the particular calling station.

Further objects and features of the invention pertain to the particular arrangement of the circuit elements of the system whereby the above outlined and additional features are attained.

Referring now more particularly to the drawing, the telephone system there illustrated comprises a main exchange designated 2M terminating a plurality of subscribers such as subscriber station 2C and the PABX, the equipment of which is illustrated on the remainder of the drawing. A 200 line capacity for this PABX system has been selected only for the purposes of illustration, and it is by no means to be understood that the invention is to be limited to a system of such size. For by the well-known practice of including selectors the exchange may be readily expanded to any size and the concept of this invention would be just as applicable.

The PABX equipment illustrated includes a plurality of linefinder connector links such as the link comprised of the linefinder switch 130 and the connector switch 215 for setting up connections between the various PABX stations. More specifically, the exchange has an ultimate capacity of 200 lines, these lines being arranged in first and second groups of 100 lines each. Each of the links comprises a 200 line linefinder switch having access to each line in the PABX and a 200 line connector switch also having access to each line in the exchange.

The lines are arranged into a first and a second group, each group being provided with an individual distributor and a group of first choice linefinders. The distributors, not shown, are so connected and arranged that a call initiated on a line in the first group of lines is assigned for use on an idle linefinder in the second group in the event all of the linefinders in the first group are in use, and the second group of lines is arranged to be accessed by the line finder switches of the first group when their associated second group of line finder switches are busy.

The subscriber stations are each associated with an individual line circuit similar to 100 and 1LB for stations 1A and 1B respectively. Preferably, these line circuits are identical, each including a line relay and a cutoff relay, these relays in the line circuit 100 being respectively indicated at R120 and R110.

Each of the links can be connected and arranged in a manner similar to the link shown which includes the finder switch 130 and the connector switch 215. The finder switch 130 comprises a switching mechanism of the Strowger type including two-hundred point banks of contact sets, arranged in ten vertical levels, each level including upper and lower rows of contact sets, each row of contact sets including ten circumferentially disposed contact sets, each contact set terminating a line extending thereto and also includes a one-hundred point bank of contacts arranged to correspond in relative position to each of the line sets. The Strowger mechanism also comprises upper and lower wiper sets respectively including the wipers 141, 142, 143 and 144, 145, 146 and the wiper 1DU carried by a carriage movable in both vertical and rotary directions, the upper and lower wiper sets being respectively associated with the upper and lower rows of contact sets in the bank of fixed contact sets; and the wiper 1DU being associated with the line marker one-hundred point contact bank.

The finder switch 130 also comprises a start relay R140, two switching relays R150 and R160 associated respectively with the lower and upper wiper sets. And also including a marking relay MRC, a detailed description of this same line circuit and a linefinder circuit may be found in the Patent No. 2,289,896 issued to P. Bakker on July 14, 1942, the designations used here have been selected to correspond with those of the Bakker patent.

The connector switch 215 illustrated, comprises a Strowger mechanism of the 200 point type having access to each line in the system and also via its ninth level to the trunk ticketer 1T, and via its zero level to the operator position 1AT. The connector switch 215 is connected and arranged in a conventional manner.

The functions of the operator position are well-known, the local subscribers access this position for information, assistance and other special services, while the operator may extend incoming calls from the main central exchange to local stations via the operator connector 1D. The trunk ticketer 1T is accessed by the local subscribers when they desire to place calls to subscribers outside of the private branch exchange. This ticketer is of the type fully disclosed in the application of J. E. Ostline et al., Serial No. 628,474, filed December 3, 1956, now Patent No. 3,019,295 issued January 30, 1962 which when accessed functions to record the directory number of the called station in the called number register 11T, causes the detector and finder to determine the calling stations directory number by the application of a detector battery 1B potential to the "C" conductor of the calling line, records this in the calling number register 12T, extends the call through the main exchange 2M to the called subscriber, times its duration and then upon its termination causes a permanent record through the tabulator 1TA and the printer 1P of all of the above data, plus the time at which the call is terminated, to be made.

The detector is shown as including the common relays 1DC and the station tens and units marking relays 710, 720 and 830, and also the hundreds and thousands marking relays 1110, 1120 and 1240. These items bear the same designations and are identical to the marking relays disclosed in the J. E. Ostline application, Serial No. 625,833, filed December 3, 1956, now Patent No. 3,024,316 issued March 6, 1962. The completion of the circuit to operate the proper marking relays is controlled by the wiper 1DU for the tens and units marking relays, and by the operation of the switch through relay in the finder for the hundreds and thousands marking relays.

A better understanding of the connection and arrangement of the apparatus incorporated in the telephone system will be facilitated from a consideration of the operation thereof incident to the extension of a call from the subscriber station 1A through the trunk ticketer 1T to or through the main exchange 2M to a subscriber station.

The call is first initiated at the station 1A by removing the handset of the telephone instrument thereat from its cradle, thereby to complete a bridge path at the station between the line conductors of the subscriber line extending to the line circuit 100. This bridge path completes the circuit to energize the winding of the line relay R120. The line relay R120 operates to complete, at RA122, an obvious path for applying ground potential to the control conductor, thereby to mark the subscriber line as busy to the connector switches having access thereto. Also, the line relay R120 completes, at RA125, an obvious path for applying ground potential to the linefinders common circuit to start a linefinder hunting for the calling line. The further operations and functions of the line circuit are conventional and not directly pertinent for the disclosure of this invention. A detailed explanation of the line circuits other operations as well as of a conventional linefinder circuit may be found in the patent to P. Bakker, No. 2,289,896 issued July 14, 1942. Only that portion of the linefinder operation will be described as is pertinent to the operation of this invention.

The linefinder start relay R140 is energized from the linefinders common circuit. Upon operating it completes a circuit at RA141 between the line conductors to the connector switch, and at contacts RA142 an obvious path for applying ground potential to the control conductors. When these paths are thus completed the connector switch 215 is conditioned to be operative in response to a digit dialed thereinto.

Upon operating, the linefinder switch had driven the wiper carriage in a vertical direction to the level in which the calling line was located, and thereafter in a rotary direction to the bank contacts associated with the calling line. At this time the wipers 141, 142 and 143 engage the line and control conductors of the calling line, line circuit 100. The cutoff relay R110 in the line circuit is not energized until circuits are completed in the linefinder common control relays for operating the proper switching relay R150 or R160. Assume a circuit is completed for energizing switching relay R160. Upon operating relay R160 connects the line and control conductors via contacts RA161, RA162 and RA163 through to the connector 215. At this point in the linefinders operation the line number marking wiper 1DU is resting on a contact of the line number marking bank DU corresponding with the tens and units digit of the called line. The switching relay R160 in operating has also prepared a circuit at contacts C61 to lead MC1 which terminates the hundreds and thousands relays of the detector register that correspond to those of the line group in which the calling line is found. Were the calling line in the second line group of the linefinder, switching relay R150 would have been operated and in consequence have completed a circuit at contacts C51 to lead MC2 which terminates the hundreds and thousands relays of the detector register that correspond to this other line groups designation. The detector cannot operate at this time for its circuit is still incomplete at contacts MRC1.

Each of the 100 contacts of the linefinder bank has an individual two digit designation from 00 to 99, the designation corresponding to the tens and units digit of the calling party's directory number. Each of the two "MC" leads from the linefinder also has an individual two digit designation corresponding to the thousands and hundreds digits of each group of subscribers to which the particular linefinder has access.

There are ten groups of ten conductors each, where each of the ten conductors in the group has a common tens digit designation. Each of the ten conductors of a group is wired through a resistor to a tens detecting relay, such as relay 710, which upon operating places a code marking corresponding to its group designation upon a group of conductors, and extends via a slave relay such as 720 the ten conductors to a succeeding relay circuit which identifies the units digit of the conductor involved. This succeeding circuit includes ten relays, such as the relay 830, each of these relays is wired to one of the ten extended conductors of the group. The relay connected to the marked conductor operates to place a code marking corresponding to its unit designation upon another group of conductors leading to the ticketer recorder.

The "MC" conductors are connected to corresponding groups of relays, which detect the thousands and hundreds digits of the subscriber group for which the linefinder has functioned to connect to the impulse controlled switch. The "MC" conductors are also grouped into groups of ten conductors with a common thousands digit (if the exchange is large enough to warrant more groups) and through a resistor RMC are connected to a relay such as 1110 for the group having the common thousands digit "0." Similarly to the tens digit detection, the thousands digit relay extends the ten conductors to ten relays such as the relay 1240 which determines the hundreds digit marking of the "MC" conductor.

All of the "MC" conductors have negative potential in series with a resistor and relay at all times, and the marking bank contacts have positive potential in series with a resistor and relay at all times, so that almost simultaneously with the completion of a connection through a particular switching relay's contacts and the linefinder's marginal relay marking contacts, the detection is completed and the four digits of the directory number of the calling subscriber station are marked upon four groups of conductors for registration in the ticketer.

The connector 215 individually associated with the finder 130 returns a dial tone signal to the calling subscriber to indicate that he is to start dialing. The subscriber will then dial the trunk access digit "9" to cause the connector 215 to raise its wipers to the ninth level and search for an idle ticketer.

When connected to a ticketer and during the interval the caller dials the final digit "0" (zero) of the trunk access code into the ticketer, the ticketer operates to seize the detector circuit.

When the detector 1DC is operatively connected to the ticketer 1T and the digit "0" (zero) has been pulsed, the ticketer places booster battery on the caller's control lead. The caller continues to dial the called number into the ticketer where it is registered and simultaneously pulsed out to the Central Office to complete the calling connection in or through the Central Office.

The booster battery potential applied by the ticketer to the control lead passes through the connector 215 into the linefinder 130. In the linefinder this booster battery potential energizes relay MRC. Relay MRC operates and completes the operate circuit at contacts MRC1 for the detector detecting relays. The circuit of the detecting relays now extends from battery potential through the coil winding of relay 1110, resistor RMC, contacts C61 of the linefinder switching relay R160, contacts MRC1 of the linefinder's marginal marking relay MRC, the linefinder marking wiper 1DU, the linefinder marking bank contact DU corresponding to the calling parties position resistor RDU, coil winding of relay 710 to ground. Thousands relay 1110 upon operating completes a path at its make contacts for the slave relay 1120, which latter extends the lead from contacts C61 to the hundreds relay 1240. Both the thousands and hundreds relays 1110 and 1240 respectively upon operating, operate contacts to mark in code the digits corresponding to their assigned number. Relay 710 upon operating completes a path at its make contacts for the slave relay 720. Relay 720 operates and extends the lead from contact DU to the units relay 830. Both the tens and units relays 710 and 830 respectively upon operating, similarly to the thousands and hundreds relays, operate contacts to mark in code the digits corresponding to their assigned number to the ticketer.

When the detection operation is completed, the booster battery potential from the ticketer recorder is removed from the control lead, the detector equipment is released and the ticketer monitors the extended call and times it. Upon the call being terminated, the ticketer seizes a tabulator such as 1TA and a printer such as 1P and controls them to print a record of the call just terminated.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including, a first exchange, a second exchange, a trunk line connecting said exchanges, subscriber's lines in each of said exchanges, a calling one of said lines in said first exchange, switching apparatus including linefinders accessible to said lines in each of said exchanges, a means for identifying said calling line in said linefinders in said first exchange including a marking contact bank and a marking wiper operated upon said linefinder finding said calling line to mark the terminal digits of said calling line upon said bank, a digit coder connected to each of said bank contacts, a plurality of recorders common to said apparatus in said first exchange, means for extending a connection from any one of said lines in said first exchange over said apparatus to said recorders, first register means in said recorders then controlled over the extended connection to register the directory number of the called station in said second exchange, second register means in said recorders, second means effective when said register has been associated with the connection to impress a higher than exchange voltage via said connection to said switching apparatus, and relay means in said linefinders controlled by said higher voltage in said switching apparatus responsive to said operation thereof to cause said digit coder via said marking contact bank and marking wiper to operate said recorder second register means to register the identity of said calling line, sending means in said register thereafter effective to send the called number digits to said second exchange to complete a connection to a called one of said subscribers therein.

2. In a telephone system including, a first exchange, a second exchange, a trunk line connecting said exchanges, subscriber's lines in each of said exchanges, a calling one of said lines in said first exchange, switching apparatus including linefinders accessible to said lines in each of said exchanges, a means for identifying said calling line in said line finders in said first exchange including a marking contact bank and a marking wiper operated upon said linefinder finding said calling line to mark the terminal digits of said calling line upon said bank, a digit marking translator coder connected to each of said bank contacts, a plurality of recorders common to said apparatus in said first exchange, means for extending a connection from any one of said lines in said first exchange over said apparatus to said recorders, first register means in said recorders controlled over the extended connection to register the directory number of the called station in such second exchange, second register means in said recorders, second means effective when said recorder has been associated with the connection to impress a higher than exchange voltage via said connection to said switching apparatus, and relay means in said linefinders controlled by said higher voltage in said switching apparatus, contact means responsive to the operation of said relay means to cause said digit marking translator coder via said marking contact bank and marking wiper to operate said recorder second register means to register the identity of said calling line, sending means in said register thereafter effective to send the called number digits to said second exchange to complete a connection to a called one of said subscribers therein.

3. In a telephone system including, a first exchange, a second exchange, a trunk line connecting said exchanges, subscriber's lines in each of said exchanges, each said line having a directory number, a calling one of said lines in said first exchange, switching apparatus including linefinders accessible to said lines in each of said exchanges, a means for identifying said calling line in said linefinders in said first exchange including a marking contact bank and a marking wiper operated upon said linefinder finding said calling line to mark a contact indicative of the directory number of said calling line upon said bank, a digit marking translator coder connected to each of said bank contacts, a plurality of recorders common to said apparatus in said first exchange, means for extending a connection from any one of said lines in said first exchange over said apparatus to said recorders, first register means in said recorders controlled over the extended connection to register the directory number of the called station in said second exchange, second register means in said recorders, second means effective when said recorder has been associated with the connection to impress a higher than exchange voltage via said connection to said switching apparatus, and relay means in said linefinders controlled by said higher voltage in said switching apparatus, contact means responsive to the operation of said relay means to cause said digit marking translator coder via said marking contact bank and marking wiper to operate said recorder second register means to register the identity of said calling line, sending means in said recorder thereafter effective to send the called number digits to said second exchange to complete a connection to a called one of said subscribers therein, said recorder further including timing means operated upon completion of said connection to time its duration, printing means operatively connected with said recorder and operated upon termination of said completed connection to print a record of said call.

4. In an automatic telephone system including, a main exchange, a branch exchange, a trunk line connecting said exchanges, a group of subscriber stations in each of said exchanges, a calling one of said lines in said first exchange, a calling device at each station, an individual directory number for each station, switching equipment in each of said exchanges, subscriber lines connecting said subscriber stations to said switching equipment, said switching equipment including at least a linefinder and a calling device controlled switch, control means operated responsive to the initiation of a call from said calling station for selectively operating said finder to connect with the calling line, a recorder, means for extending a connection to said recorder by a calling subscriber operating said calling device at said calling station in a predetermined manner, called station register means in said recorder operated under control of said calling station calling device to register the called station directory number, a source of higher than exchange potential, relay means in said recorder operated upon access of said register to apply said higher potential from said source of higher potential through said switching means to said linefinder; a means for identifying said calling line in said linefinder including a marking bank assembly having contacts each corresponding to two digits of a calling line number, a settable wiper operated to a contact of said marking bank upon said linefinder connecting with said calling line, a switch through relay in said finder operated by said control means, and a marginal relay in said finder operated by said higher potential, make contacts on each of said relays, a calling station detector including tens and units digit register relays connected to appropriate contacts of said contact bank and hundreds and thousands digit register relays connected to corresponding linefinders, said register relays operated upon completion of a circuit through said contacts on said switch through relay and said marginal relay, said marking wiper on associated bank contact to operate said recorder second register means to register the identity of said calling line, sending means in said recorder thereafter operated to send the called number digits to said main exchange to complete a connection to a called one of said subscribers therein.

5. In a telephone system including a group of lines, each of said lines having a multi-digit identifying number individual thereto, a linefinder associated with said lines, said linefinder operated upon initiation of a call from one of said lines to connect with said line, a marking bank associated with said finder, a marking wiper on said finder operated to a contact of said marking bank upon said finder connecting to a calling one of said lines, a first group of coding relays connected to said linefinder marking bank, each of said coding relays of said group connected to a contact of said bank corresponding to the designation of said contact, a mark relay and a switch-through relay in said finder, a second group of coding relays, each of said coding relays of said second group connected to a contact of the switch-through relay of a finder of the corresponding finder group, means responsive to a call from any one of said lines for impressing a marking potential on a control conductor individual to said finder associated with said calling line to operate the associated mark relay, circuit means completed upon operation of said mark relay including said linefinder bank, said wiper, said switch-through relay and said coding relays of said first and second groups of coding relays to code the corresponding identifying number individual to the calling line.

References Cited in the file of this patent

UNITED STATES PATENTS

| | | |
|---|---|---|
| 2,595,106 | Scudder | Apr. 29, 1952 |
| 2,629,016 | Gooderham | Feb. 17, 1953 |
| 2,686,840 | Den Hertog | Aug. 17, 1954 |
| 2,695,928 | Joel | Nov. 30, 1954 |
| 2,773,127 | Coleman | Dec. 4, 1956 |